United States Patent [19]

Hodges

[11] 4,407,478
[45] Oct. 4, 1983

[54] PIPE HANGER

[76] Inventor: Bonnie E. Hodges, 761 Palmer Dr., Greenville, Mich. 48838

[21] Appl. No.: 241,373

[22] Filed: Mar. 6, 1981

[51] Int. Cl.³ .......................................... F16M 13/00
[52] U.S. Cl. .................................. 248/542; 248/62; 248/74 A
[58] Field of Search .................. 248/542, 58, 59, 62, 248/63, 74 R, 74 A, 71

[56] References Cited

U.S. PATENT DOCUMENTS

| 521,149 | 6/1894 | Boyd . | |
|---|---|---|---|
| 525,891 | 9/1894 | Fricke | 248/71 UX |
| 661,604 | 11/1900 | Grabler . | |
| 1,804,472 | 8/1926 | Leslie . | |
| 2,319,832 | 5/1943 | Trochim | 248/71 UX |
| 2,854,824 | 10/1958 | Curry et al. | 248/58 X |
| 2,862,368 | 12/1958 | Dempsey | 248/58 X |
| 3,136,515 | 6/1962 | Potruch . | |
| 3,273,837 | 9/1966 | Willert et al. | 248/59 |
| 3,279,300 | 10/1966 | Larson | 248/71 X |
| 3,355,132 | 11/1967 | Jenkins . | |
| 3,559,910 | 12/1968 | Babb . | |
| 3,888,439 | 6/1975 | Tuttle . | |
| 4,042,198 | 8/1977 | Takeuchi | 248/62 |
| 4,254,930 | 3/1981 | Warren | 248/58 X |

FOREIGN PATENT DOCUMENTS 305003  1/1929  United Kingdom ................. 248/71

Primary Examiner—J. Franklin Foss
Attorney, Agent, or Firm—Varnum, Riddering, Wierengo & Christenson

[57] ABSTRACT

A pipe hanger (10) for suspending a pipe (12) from a support beam (14) includes at least one flexible curved portion (16) which receives the pipe (12) in a snap-fit connection. The hanger (1) includes an elongate stem (22) for mounting the hanger (10) to the support beam (14). The stem (22) has a prismatic cross-section and a plurality of holes (26) extending therethrough in mutually perpendicular directions and graduated marking therealong. A plurality of hangers (10) can be used to mount a pipe (12) at an incline relative to the support (14) using the markings as guides.

13 Claims, 6 Drawing Figures

PIPE HANGER

TECHNICAL FIELD

The invention relates to a pipe hanger for suspending pipes from a support structure.

BACKGROUND ART

In order to install pipes along supports, such as joists in houses, the pipes are mounted by a plurality of pipe hangers. Each hanger can include a hook or clamp portion which receives the pipe and a stem extending from the hook or clamp portion for attachment to a joist or rafter. Normally, water pipes have a slight incline to allow water to drain from the pipes prior to brazing the joints. Further, waste pipes are required by code to have an incline of ⅛ inch per foot and are required to be supported at four-foot increments. Ordinarily the hangers are first secured to the joists and then the pipes are placed in the hangers. It is therefore necessary to secure the hangers to the joists at graduated heights to allow drainage. Normally, the plumber must use hammer and nail to secure the hangers. The operation of hammering the nail and holding the hanger takes both hands. It is difficult if not impossible to measure the distances of the hangers from the joists and then to hammer a nail with the joists at a measured distance.

U.S. Pat. No. 661,604, issued Nov. 13, 1900, To Grapler discloses a pipe hanger having a generally U-shaped hook portion for receiving a pipe and an extending stem or flange which is secured to a support structure through prongs which extend perpendicular to the stem. The hook portion is formed of metal and may bent around the pipe to provide a secure connection. The prongs provide a means for attaching the hanger to a joist so that the hanger can be secured in a suitable location prior to hammering a nail into the joist.

The Babb U.S. Pat. No. 3,559,910, issued Feb. 2, 1971, discloses a plastic pipe hanger including a circular collar which receives a pipe. When the pipe is inserted with the collar, snap-like connector members are fastened to secure the pipe in place. The collar is mounted through pins to a strap having a plurality of holes for mounting the hanger device at a desired height relative to a stud. It appears that two hands are needed to separate the collar to insert the pipe and to reclamp the collar.

The Tuttle U.S. Pat. No. 3,888,439, issued June 10, 1975, discloses an exhaust pipe hanger includinng spring-like tongs for receiving a pipe or muffler. The tongs of the hanger portion are resilient so as to firmly grip the pipe and prevent inadvertent disengagement. It appears that two hands are needed to separate the tongs. The hanger portion is mounted to an elongate strip including a plurality of holes which enable the pipe to be secured to a support structure and positioned at a desired height.

One of the deficiencies with the prior known hanger is that the same hanger cannot be used to support a pipe along a single support or across a number of parallel supports. The above-described hangers all include a mounting portion which allows for mounting in a single direction. Different hangers are necessary if one is to mount a pipe along a support or across a number of supports. Also, the hangers can only support one pipe when in fact it is often desirable to mount a number of pipes adjacent to each other. Further, it is difficult if not impossible to mount the hangers at controlled distances from the joist without painstaking measuring and careful placement of the hangers, all of which is usually conducted on a ladder. Also, many of the pipe claws require use of two hands which makes it difficult to handle the pipe.

DISCLOSURE OF THE INVENTION

According to the invention, a pipe hanger for suspending at least one pipe from a support includes an elongate stem for mounting to a support and at least one flexible curved portion extending therefrom. The curved portion has a radius of curvature approximately equal to the pipe radius, and extends through an arc of more than 180°, preferably near 270°, thus enabling the pipe to be releasably received and secured by the curved portion in a snap-fit connection. The at least one curved portion can be provided with a rib member along one side thereof so as to reinforce the curved portion. A protrusion can be positioned at the juncture of stem and the at least one curved portion to enhance the arc and further secure the pipe therein.

The stem has a prismatic cross-section through which at least one hole extends for holding a nail. In the preferred embodiment of the invention, the stem has a rectangular cross-section, and a plurality of holes are spaced apart at selected distances along the stem. The holes extend through the cross-section in mutually perpendicular directions. Graduated markings are provided along the stem to visually indicate reference distances for mounting the hanger at different spaced distances from the supports.

In an alternate embodiment, the at least one curved portion includes at least one generally U-shaped mount for releasably receiving and securing a pipe in a snap-fit connection. A segment extends between the at least one mount and the stem so as to space the pipe from the stem.

A plurality of the pipe hangers may be used to suspend a pipe at an incline relative to a support. The stem of each pipe hanger includes at least one hole therethrough at a selected location on the stem. The curved portion of each pipe hanger, when secured a support, lies in a common imaginary line which is at an angle relative to the support. In this way, the pipe can be mounted on an incline. Graduated markings are positioned along the stem so as to allow each hanger to be mounted at a different height on the support relative to the adjacent hanger and thus provide the desired inclination of the pipe.

DETAILED DESCRIPTION OF THE DRAWINGS

The invention will now be described with reference to the accompanying drawings in which.

BEST MODE FOR CARRYING OUT THE INVENTION

Figure 1:
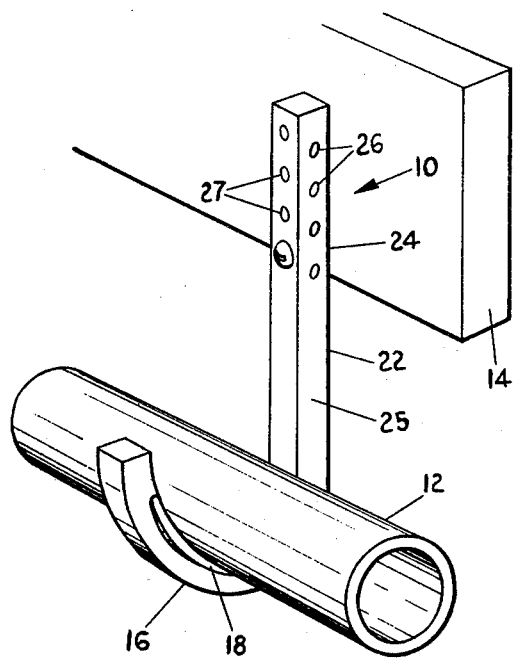
FIG. 1 is a perspective view of a pipe suspended from a hanger in accordance with the invention which is mounted along its rear surface to a support structure.

Referring to FIG. 1, a pipe hanger 10 is shown in position for suspending a pipe 12 from a support beam 14. The pipe hanger 10 is mounted to a support beam 14 with the use of a conventional nail. The beam 14 is typically a joist or runner in a building. The pipe 12 is made of either of a metal or a plastic material.

Figure 2:
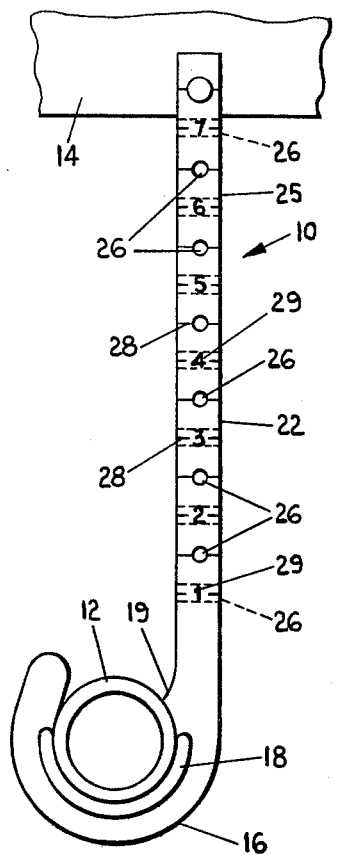
FIG. 2 is a side view of the hanger of FIG. 1 mounted along a side surface to a support structure.
Figure 3:
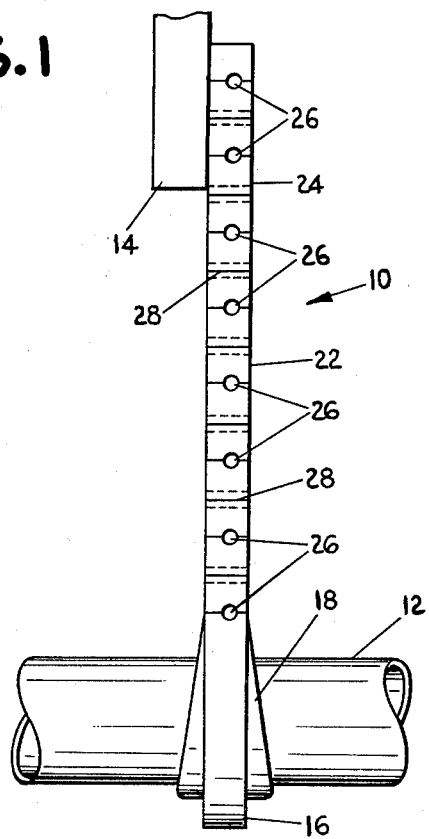
FIG. 3 is a front view of the hanger of FIG. 2.

As seen in FIGS. 1–3, the pipe hanger 10 includes an elongate stem 22 for mounting to the beam 14 and a curved portion 16 integral with the stem 22. The curved portion 16 receives the pipe 12 therein. Outwardly-extending ribs 18 are provided on one or both sides of the curved portion 16 to thereby increase the surface area of the curved portion 16 in which the pipe seats and reinforce the curved portion. The ribs can extend up along the stem to a locking lobe 19 for strengthening. The curved portion 16 has a radius of curvature approximately equal to the radius of the pipe 12.

A protrusion or locking lobe 19 extends from the stem at the juncture between the stem 22 and the curved portion 16 to further secure the pipe 12 within the curved portion 16. The protrusion 19 reduces the diameter between the end of the curved portion 16 and the stem 22 so as to extend the curvature of the inner surface of the curved portion 16 to provide for a snap-fit of the pipes therein and to ensure that the pipes remain seated on the hanger. The distance between the protrusion 190 and the end of the curved portion is less than the pipe diameter. Thus, the curved portion must be flexed outwardly when a pipe is seated into place. In practice, the pipe is forced downwardly against the outer end of the curved portion 16 and against the juncture between the stem 22 and the curved portion 16 to flex of the curved portion 16 the end outwardly until the pipe snaps below the protrusion 19. At that point, the pipe will snap into place in the bottom of the curved portion and remain secure in that position due to the resiliency of the curved portion. Thus, the pipe can be snapped into place in the hanger with one hand after the hanger has been secured to a support or beforehand, if desired.

Extending upwardly from the curved portion 16 is the elongate stem 22, which in a preferred embodiment has a square cross-section. Although the stem 22 is depicted having a square cross-section any prismatic cross-section can be used. A plurality of holes 26 are provided along the stem 22. The holes 26 extend through the cross-section of the stem 22. In the embodiment of FIGS. 1–3, the holes 26 extend in mutually perpendicular directions through the cross-section in spaced relationship. The holes are of sufficient length and size so as to support and retain a nail prior to fastening the hanger to a support. Thus, the holes allow the hanger and nail to be held in one hand for sure and accurate placement adjacent the joist, thus freeing the other hand for a hammer.

Nails or fasteners are inserted through the holes 26 to mount the pipe hanger 10 to the support beam 14. The holes 26 are spaced apart at selected intervals along the length of the stem 26 so that a pipe 12 may be suspended from a beam 14 at various heights. Furthermore, the pipe hanger 10 can be mounted to the support beam 14 on any of its four sides so that a pipe 12 may run perpendicular or parallel to the support beam 14. In FIG. 1, the rear side 24 of the hanger 10 relative to the hook is mounted to the beam 14, thus enabling the pipe 12 to be suspended parallel to the beam 14. In FIGS. 2 and 3, the hanger 10 is secured to the beam 14 on one of its lateral sides 25 so that the pipe 12 can be suspended perpendicular to the beam 14.

The stem 22 of the hanger is further provided with a series of graduated markings 28 and numerals 29. The markings appear on all faces of the stem at regular intervals to function as a gauge of distance from the pipe to the bottom of the joist. The markings and numerals are preferably molded directly into the hanger.

Figure 4:
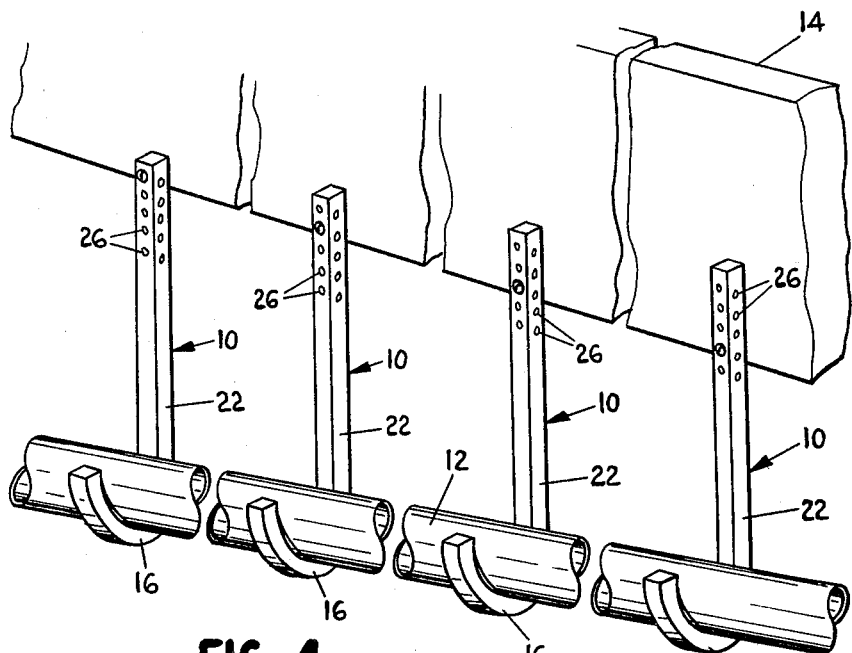
FIG. 4 is a perspective view of a pipe suspended from a single support with a plurality of hangers in accordance with the invention.
Figure 5:
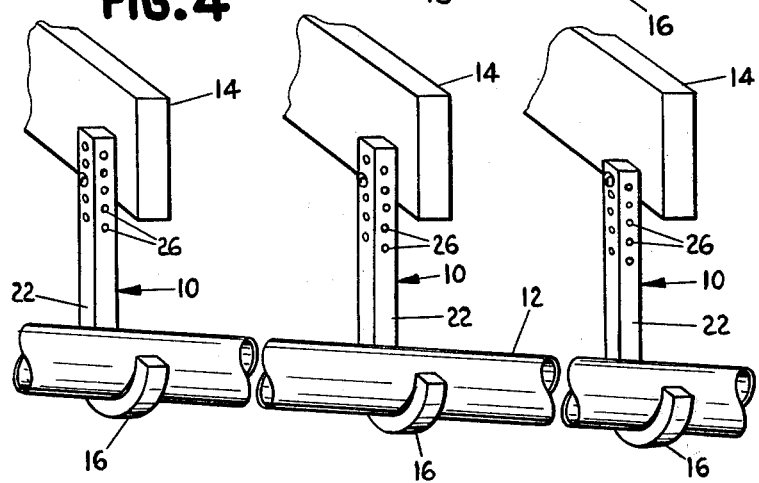
FIG. 5 is a perspective view of a pipe suspended from a series of supports by a plurality of hangers in accordance with the invention.

As depicted in FIGS. 4 and 5, a plurality of pipe hangers 10 can be used to suspend a pipe 12 at an incline relative to a support structure. In FIG. 4 a plurality of pipe hangers 10 are mounted at regular intervals along a support beam 14. Each hanger 10 is mounted by a successive hole 26 on the stem, thereby positioning the curved portion at a different height relative to the support. The curved portions 16 of each successive hanger 10 are thus aligned on an imaginary line which is at an angle relative to the support. In this way, the pipe is inclined.

In FIG. 5, a pipe 12 is suspended by a plurality of hangers 10 across a series of support beams 14. Each hanger 10 is mounted to a beam 14 by a different height hole 26 on the hanger 10, so that the curved portions 16 of each hanger 10 are aligned at an incline relative to the series of support beams 14. Again, this provides for mounting of the pipe at an incline.

In order to suspend a plurality of pipes from a single location, two hangers 10 can be connected or glued together and mounted at the same location on the support. Further, pipes 12 of varying radii can be suspended from a single location by hangers 10 having curved portions 16 with radii corresponding to the pipe size are fastened together. The two hangers 10 are joined together by connecting one side of the stem 22 of one of the two hangers 10 with the same or different side of the stem 22 of the other hanger 10 at a selected distance along the stem 22 of the other hanger 10, so long as neither hanger 10 interferes with the curved portion which is the pipe 12.

Figure 6:
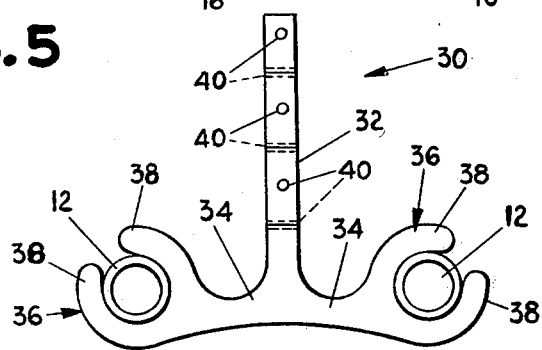
FIG. 6 is a side view of an alternative embodiment of a hanger in accordance with the invention.

An alternative embodiment of the invention for suspending two pipes from a single hanger is shown in FIG 6. The hanger 30 includes a stem 32 similar to that of the hanger 10. Two segments 34 extend outwardly from the stem 32 and terminate in generally U-shaped mounts which receive pipes 12 in a snap-fit connection. The mounts 36 are comparable to the curved portion 16 of the hanger 10 in function and structure in that the radius of curvature of each mount 36 is approximately equal to the pipe radius. The distance between the legs 38 of the mounts 36 is slightly less than the pipe diameter, thus requiring that the pipe be forced into place so as to insure a snap-fit connection. The stem 32 includes a plurality of holes 40 which extend through the cross-section thereof as described with reference to the hanger of FIGS. 1–3. The segment 34 integral with both the stem 22 and the mounts 36 permits the pipes 12 to be spaced apart from the stem 22 when mounted. Accordingly, several pipes 12 can be suspended from a single location with each pipe 12 being positioned apart from each other. In this way, access to each pipe necessary for servicing, is maintained. As with the hanger 10, a pipe 12 can be suspended with hanger 30 perpendicular, parallel or at an incline relative to supports as described with reference to FIGS. 4 and 5.

The pipe hangers 10 and 30 can be made out of metal or different types of plastic material, for example polyvinylchloride or high-strength acrylonitrile-butadiene-styrene. Resilient plastic materials are preferred since such materials are strong and flexible. Further, the hangers can be molded in one piece with plastics.

Thus, the curved portions 16 and the mounts 36 of the pipe hangers 10 and 30, respectively, enables one ot easily mount a pipe 12 to a support. In order to secure the pipe to the hanger, the pipe is positioned over the curved portion of the hook and forced into place. As the pipe is inserted, it flexes the curved portion or legs of the mount outwardly so as to allow the pipe to become seated in the hanger. The resiliency of the curved portion or mount allows for the flexing and provides the snap-fit connection.

The curved portions 18 and the mounts 36 form an arc of at least 180° and preferably up to 270° for snap fit and locking of the pipe into place on the hangers.

The elongate stems 22, 32 of the pipe hangers 10 and 30 enables one to easily mount the pipe hangers 10 and 30 to a support beam 14. Additionally, the plurality of holes 26 which extend through the square cross-section of the stem allow for the hangers 10 and 30 to be mounted along its front, rear or lateral sides and thereby provides mounting flexibility not shown in the prior art. When a series of pipe hangers 10 or 30 are mounted at regular intervals with the use of successive holes and graduated marking on the stem, the pipe is suspended at an incline relative to a single or series of support beams 14. Further, several pipes 12 can be suspended with a plurality of single hnagers 10, a plurality of hangers 10 connected together or the pipe hanger 30.

The graduated marking 28 on the stem 22 allow accurate placement of the pipe hanger at successively higher or lower locations. For example, in waste pipe systems, each successive pipe hanger is displaced one marking (assuming ½ inch markings) on the stem when the pipe hangers are suspended at four-foot intervals.

The snap-fit of the curved portion 16 securely holds the pipe in place. The grip is secure enough to permit the pipe hanger to securely retain the pipe whether the pipe hanger is in inverted, horizontal or right-side-up orientation. Further, the use of plastics such as polyvinyl chloride or ABS permits adhesive securing of plastic pipes to the pipe hanger.

The foregoing description and drawings are merely illustrative of the invention and are not intended to limit the invention to the above-described embodiments. Variations, modifications and changes which may be obvious to one skilled in the art may be made without departing from the scope and spirit of the invention as defined in the appended claims.

The embodiments of the invention in which an exclusive property or privilege is claimed are defined as follows:

1. A pipe hanger for suspending at least one pipe from a support, said pipe hanger comprising:
   an elongate stem for mounting to a support and at least one flexible curved portion connected to said stem;
   the at least one flexible curved portion having a radius of curvature defining an arc from the juncture between the stem and the curved portion to an end of the curved portion in excess of 180°;
   the end of said curved portion being spaced from the stem a distance less than the diameter of the curved portion and the curved portion being of a shape so that a pipe, having a radius of about the radius of the curved portion, can be securely seated and snap-fit in the curved portion by forcing said pipe downwardly toward the curved portion from a position between the end of the curved portion and the stem;
   the elongate stem having a prismatic cross-section with the sides of the stem adapted to be positioned adjacent the support;
   the stem having at least two holes located at a selected position on the stem and extending through the prismatic cross-section, with the axis of at least one hole being at an angle relative to the axis of at least one other hole so that the pipe hanger can be nailed at different orientations with respect to the support;
   wherein the stem is adapted to mount the at least one pipe to the support at a selected height and angle relative to the support and the curved portion receives the pipe in a snap-fit connection.

2. The pipe hanger according to claim 1 including a plurality of holes spaced apart at selected distances along the stem for retaining nails and for securing the hanger to a support.

3. The pipe hanger according to claim 2 wherein the stem has a rectangular cross-section, and the holes extend through the stem in mutually perpendicular directions.

4. The pipe hanger according to claim 1 wherein the at least one curved portion is made of a resilient plastic material.

5. The pipe hanger according to claim 1 further comprising at least one rib member integral with and extending along at least one side of the at least one curved portion, so that said rib reinforces said curved portion.

6. The pipe hanger according to claim 1 further comprising:
   a protrusion located at the junction between the stem and the at least one curved portion and extending the arc of the curved portion;
   the protrusion being so shaped to enable the pipe to be forced downwardly against the end of the at least one curved portion and the junnction between the stem and the at least one curved portion until the end of the at least one curved portion is flexed outwardly and said pipe slides against the protrusion until said pipe snaps below the protrusion to be securely seated in the at least one curved portion in a snap-fit connection.

7. A pipe hanger according to claim 1 and further comprising a plurality of graduated markings integrally molded to the elongate stem to assist in placing successive pipe hangers at different distances from the support.

8. A pipe hanger according to claim 7 wherein the pipe hanger is integrally molded in one piece from a resilient plastic material.

9. A pipe hanger according to claim 8 and further comprising a protrusion projecting toward the curved portion from the junction between the stem and at least one curved portion to extend the arc of the curved portion to then further secure the at least one pipe within the at least one curved portion in a snap-fit connection.

10. A pipe hanger according to claim 9 wherein the curved portion and the protrusion form an arc of about 270°.

11. A pipe hanger arrangement for mounting at least one pipe on an incline relative to at least one support comprising:

a plurality of pipe hangers in accordance with claim 7;

the at least one curved portion of each pipe hanger receiving and securing the pipe in a snap-fit connection; and the hangers being mounted to the at least one support at a different height on the support relative to the adjacent hanger;

wherein the axis of the curved portion of each pipe hanger lies in a common imaginary line disposed at an angle relative to said support so as to mount the pipe along an incline.

12. A pipe hanger according to claim 1 wherein the curved portion forms an arc of about 270°.

13. A pipe hanger for suspending at least one pipe from a support, said pipe hanger comprising:

an elongate stem for mounting to a support;

at least one curved portion connected to said stem, said curved portion comprising:

at least one generally U-shaped, flexible mount having a radius of curvature defining an arc in excess of 180° and having a shape so that the at least one pipe having a radius of about the radius of the at least one mount can be securely seated and snap-fit in the at least one mount by forcing the pipe downwardly toward the at least one mount;

a segment extending between the at least one mount and the stem and integral therewith so as to space the pipe secured to the mount at a distance from the stem;

the elongate stem having a prismatic cross-section with the sides of the stem adapted to be positioned adjacent the support;

the stem having at least one hole located at a selected position on the stem and extending through the prismatic cross-section;

wherein the stem is adapted to suspend the at least one pipe from the support at a selected height and angle relative to the support and the mount receives the pipe in a snap-fit connection.

* * * * *